United States Patent [19]

Erner

[11] 4,364,743

[45] Dec. 21, 1982

[54] SYNTHETIC LIQUID FUEL AND FUEL MIXTURES FOR OIL-BURNING DEVICES

[76] Inventor: William E. Erner, 5840 New England Woods Dr., Burke, Va. 22015

[21] Appl. No.: 160,434

[22] Filed: Jun. 17, 1980

Related U.S. Application Data

[63] Continuation-in-part of Ser. No. 72,699, Sep. 5, 1979, abandoned.

[51] Int. Cl.$^3$ ................................................. C10L 1/18
[52] U.S. Cl. ........................................... 44/66; 44/57
[58] Field of Search ...................................... 44/66, 57

[56] References Cited

U.S. PATENT DOCUMENTS

| | | | |
|---|---|---|---|
| 1,692,784 | 11/1928 | Orelup et al. | 44/66 |
| 2,236,590 | 4/1941 | Backoff et al. | 44/66 |
| 3,658,707 | 4/1972 | Delafield et al. | 44/66 |
| 3,879,176 | 4/1975 | Tsanemi | 44/66 |

FOREIGN PATENT DOCUMENTS

| | | |
|---|---|---|
| 1306233 | 2/1973 | United Kingdom . |
| 1413323 | 11/1975 | United Kingdom . |
| 1525804 | 9/1978 | United Kingdom . |

OTHER PUBLICATIONS

M. Lowry, *La France Energetique*, No. 11-12, 1945, pp. 332, 334.
M. Van Den Abeele, *Bul. Agr. Congo Belge*, 33, 1942, pp. 3-90.
Symposium of the South African Institute of Agricultural Engineers "Sunflower Seed Oil as an Extender for Diesel Fuel in Agricultural Tractors"-A Paper—Jun. 1980.

*Primary Examiner*—Jacqueline V. Howard
*Attorney, Agent, or Firm*—Armstrong, Nikaido, Marmelstein & Kubovcik

[57] ABSTRACT

A synthetic fuel of fatty acid esters provides a novel source of energy when burned alone or in combination with other known fuels such as diesel oil, heating oil, etc., in oil-burning devices.

6 Claims, No Drawings

SYNTHETIC LIQUID FUEL AND FUEL MIXTURES FOR OIL-BURNING DEVICES

CROSS REFERENCE TO RELATED APPLICATIONS

This is a continuation-in-part of application Ser. No. 06/072,699 filed Sept. 5, 1979, now abandoned.

BACKGROUND OF THE INVENTION

The present invention relates to fuels as energy sources for oil-burning devices such as diesel engines, jet engines, turbines, and heating furnaces such as used in the home, and, more particularly, to synthetic or substitute fuels which can replace or be used in combination with known fuel sources. Fossil fuel sources are becoming more expensive as the supply slowly decreases. It is recognized that, in the future, such supplies may become depleted.

In the past, attempts have been made to use alkyl fatty esters as additives to gasoline. U.S. Pat. No. 1,692,784, issued Nov. 20, 1928, teaches the use of small amounts of alkyl fatty esters as a detergent additive for gasoline to remove carbon formed as the result of burning the low octane natural gasolines being used in automobile engines at that time, i.e., 1928. Since alkyl fatty esters would not vaporize in the carburetors of ordinary automobile gasoline engines when used as a fuel itself, the use was limited to small amounts as an additive only.

Furthermore, oil-burning engines, such as the automobile diesel engine, were not introduced for commercial use until about the year 1936. Accordingly, U.S. Pat. No. 1,692,784 is limited in its teaching of using alkyl fatty esters as an additive for gasoline in gasoline engines. Even if alkyl fatty esters could have been utilized as a fuel in accordance with the teachings of the patent, undesirable results would be obtained such as lowering the octane number of the gasoline, decreasing the mechanical efficiency of gasoline engines, increasing engine knock and causing build-up of carbon in the engines. The latter result is the very problem which was taught to be avoided when the alkyl fatty esters were used only as an additive to gasoline.

Efforts have been made to preserve the present supply of gasoline by reducing its use and even mixing other fuels such as alcohol therewith. However, such efforts have been primarily directed to fuels such as gasoline for use in automobile gasoline engines.

In the past, petroleum middle distillates such as diesel oil were popular because of greater burning efficiency and lower price. However, the cost of these fuels has also increased significantly and is approaching the price of gasoline. Accordingly, there is a need for a fuel which will preserve or extend the supply of petroleum middle distillates to meet the increasing demand for these fuel-efficient products.

SUMMARY OF THE INVENTION

The present invention is directed to a novel fuel source for oil-burning devices such as diesel engines, jet engines, turbines, and home heating furnaces, which is a fuel in and of itself or can be mixed with presently available petroleum middle distillates. It has now been discovered that certain fatty acid esters can provide such a fuel, said compounds having the formula:

$$R-O-\overset{\overset{O}{\|}}{C}-C_nH_aO_x \quad (I)$$

wherein (a) R is (1) an alkyl radical having from 1 to 12 carbon atoms, (2) alkoxy alkyl wherein the alkoxy portion has from 1 to 4 carbon atoms and the alkyl portion is ethyl or propyl, (3) cyclopentyl or cyclohexyl and (4) hydroxy ethyl and hydroxypropyl, (b) n=11-22, (c) a=2n+1, 2n-1, 2n-3, 2n-5 or 2n-7 and (d) x is 0 or 1.

The fatty acid esters of formula (I) generally have a molecular weight in the range of from about 214 to about 489 and a boiling point in the range of from about 120° C./5 mm to about 340° C./1 mm, preferably from about 166° C./5 mm to about 330° C./5 mm. The esters having such properties are similar to petroleum middle distillates such as diesel oil, home heating oil, jet aircraft fuel, etc., which are currently being used as fuels.

Examples of the esters of formula (I) that may be employed in the present invention include:

(1) Methyl laurate, methyl myristate, methyl palmitate, methyl oleate, methyl elaidate, methyl linoleate, methyl linolenate, methyl stearate, methyl erucate, methyl ricinoleate, methyl licanate, methyl elaeostearate, methyl arachidonate, and methyl clupanodonate.

(2) Ethyl laurate, ethyl myristate, ethyl palmitate, ethyl oleate, ethyl elaidate, ethyl linoleate, ethyl linolenate, ethyl stearate, ethyl erucate, ethyl ricinoleate, ethyl licanate, ethyl elaeostearate, ethyl arachidonate, and ethyl clupanodonate.

(3) Propyl laurate, propyl myristate, propyl palmitate, propyl oleate, propyl elaidate, propyl linoleate, propyl linolenate, propyl stearate, propyl erucate, propyl ricinoleate, propyl licanate, propyl elaeostearate, propyl arachidonate, and propyl clupanodonate.

(4) Isopropyl laurate, isopropyl myristate, isopropyl palmitate, isopropyl oleate, isopropyl elaidate, isopropyl linoleate, isopropyl linolenate, isopropyl stearate, isopropyl erucate, isopropyl ricinoleate, isopropyl licanate, isopropyl elaeostearate, isopropyl arachidonate, and isopropyl clupanodonate.

(5) Butyl laurate, butyl myristate, butyl palmitate, butyl oleate, butyl elaidate, butyl linoleate, butyl linolenate, butyl stearate, butyl erucate, butyl ricinoleate, butyl licanate, butyl elaeostearate, butyl arachidonate, and butyl clupanodonate.

(6) Sec.butyl laurate, sec.butyl myristate, sec.butyl palmitate, sec.butyl oleate, sec.butyl elaidate, sec.butyl linoleate, sec.butyl linolenate, sec.butyl stearate, sec.butyl erucate, sec.butyl ricinoleate, sec.butyl licanate, sec.butyl elaeostearate, sec.butyl arachidonate, and sec.butyl clupanodonate.

(7) Isobutyl laurate, isobutyl myristate, isobutyl palmitate, isobutyl oleate, isobutyl elaidate, isobutyl linoleate, isobutyl linolenate, isobutyl stearate, isobutyl erucate, isobutyl ricinoleate, isobutyl licanate, isobutyl elaeostearate, isopropyl arachidonate, and isobutyl clupanodonate.

(8) Amyl laurate, amyl myristate, amyl palmitate, amyl oleate, amyl elaidate, amyl linoleate, amyl linolenate, amyl stearate, amyl erucate, amyl ricinoleate, amyl licanate, amyl elaeostearate, amyl arachidonate, and amyl clupanodonate.

(9) Hexyl laurate, hexyl myristate, hexyl palmitate, hexyl oleate, hexyl elaidate, hexyl linoleate, hexyl linolenate, hexyl stearate, hexyl erucate, hexyl ricinoleate, hexyl licanate, hexyl elaeostearate, hexyl arachidonate, and hexyl clupanodonate.

(10) Heptyl laurate, heptyl myristate, heptyl palmitate, heptyl oleate, heptyl elaidate, heptyl linoleate, heptyl linolenate, heptyl stearate, heptyl erucate, heptyl ricinoleate, heptyl lincanate, heptyl elaeostearate, heptyl arachidonate, and heptyl clupanodonate.

(11) Octyl laurate, octyl myristate, octyl palmitate, octyl oleate, octyl elaidate, octyl linoleate, octyl linolenate, octyl stearate, octyl erucate, octyl ricinoleate, octyl licanate, octyl elaeostearate, octyl arachidonate, and octyl clupanodonate.

(12) 2-ethylhexyl laurate, 2-ethylhexyl myristate, 2-ethylhexyl palmitate, 2-ethylhexyl oleate, 2-ethylhexyl elaidate, 2-ethylhexyl linoleate, 2-ethylhexyl linolenate, 2-ethylhexyl stearate, 2-ethylhexyl erucate, 2-ethylhexyl ricinoleate, 2-ethylhexyl licanate, 2-ethylhexyl elaeostearate, 2-ethylhexyl arachidonate, and 2-ethylhexyl clupanodonate.

(13) t-Butyl laurate, t-butyl myristate, t-butyl palmitate, t-butyl oleate, t-butyl elaidate, t-butyl linoleate, t-butyl linolenate, t-butyl stearate, t-butyl erucate, t-butyl ricinoleate, t-butyl licanate, t-butyl elaeostearate, t-butyl arachidonate, and t-butyl clupanodonate.

(14) Isooctyl laurate, isooctyl myristate, isooctyl palmitate, isooctyl oleate, isooctyl elaidate, isooctyl linoleate, isooctyl linolenate, isooctyl stearate, isooctyl erucate, isooctyl ricinoleate, isooctyl licanate, isooctyl elaeostearate, isooctyl arachidonate, and isooctyl clupanodonate.

(15) Nonyl laurate, nonyl myristate, nonyl palmitate, nonyl oleate, nonyl elaidate, nonyl linoleate, nonyl linolenate, nonyl stearate, nonyl erucate, nonyl ricinoleate, nonyl licanate, nonyl elaeostearate, nonyl arachidonate, and nonyl clupanodonate.

(16) Decyl laurate, decyl myristate, decyl palmitate, decyl oleate, decyl elaidate, decyl linoleate, decyl linolenate, decyl stearate, decyl erucate, decyl ricinoleate, decyl licanate, decyl elaeostearate, decyl arachidonate and decyl clupanodonate.

(17) Undecyl laurate, undecyl myristate, undecyl palmitate, undecyl oleate, undecyl elaidate, undecyl linoleate, undecyl linolenate, undecyl stearate, undecyl erucate, undecyl ricinoleate, undecyl licanate, undecyl elaeostearate, undecyl arachidonate and undecyl clupanodonate.

(18) Dodecyl laurate, dodecyl myristate, dodecyl palmitate, dodecyl oleate, dodecyl elaidate, dodecyl linoleate, dodecyl linolenate, dodecyl stearate, dodecyl erucate, dodecyl ricinoleate, dodecyl licanate, dodecyl elaeostearate, dodecyl arachidonate, and dodecyl clupanodonate.

(19) Methyl brasidate, ethyl brasidate, propyl brasidate, isopropyl brasidate, butyl brasidate, sec.butyl braisidate, isobutyl brasidate, t-butyl brasidate, amyl brasidate, hexyl brasidate, heptyl brasidate, octyl brasidate, 2-ethylhexyl brasidate, isooctyl brasidate, nonyl brasidate, decyl brasidate, undecyl brasidate, dodecyl brasidate.

(20) Hydroxyethyl laurate, hydroxyethyl myristate, hydroxyethylpalmitate, hydroxyethyl oleate, hydroxyethyl elaidate, hydroxyethyl linoleate, hydroxyethyl linolenate, hydroxyethyl stearate, hydroxyethyl erucate, hydroxyethyl ricinoleate, hydroxyethyl licanate, hydroxyethyl elaeostearate hydroxyethyl arachidonate, hydroxyethyl clupanodonate and hydroxyethyl brasidate.

(21) Polyethoxylated lauric acid, polyethoxylated myristic acid, polyethoxylated palmitic acid, polyethoxylated oleic acid, polyethoxylated elaidic acid, polyethoxylated linoleic acid, polyethoxylated linolenic acid, polyethoxylated stearic acid, polyethoxylated erucic acid, polyethoxylated ricinoleic acid, polyethoxylated licanic acid, polyethoxylated elaeostearic acid, polyethoxylated arachidonic acid, polyethoxylated clupanodonic acid and polyethoxylated brasidic acid.

(22) Hydroxpropyl laurate, hydroxypropyl myristate, hydroxypropyl palmitate, hydroxypropyl oleate, hydroxypropyl elaidate, hydroxypropyl linoleate, hydroxypropyl linolenate, hydroxypropyl stearate, hydroxypropyl erucate, hydroxypropyl ricinoleate, hydroxypropyl licanate, hydroxypropyl elaeostearate, hydroxypropyl arachidonate, hydroxypropyl clupanodonate and hydroxypropyl brasidate.

(23) Polypropoxylated lauric acid, polypropoxylated myristic acid, polypropoxylated palmitic acid, polypropoxylated oleic acid, polypropoxylated elaidic acid, polypropoxylated linoleic acid, polypropoxylated linolenic acid, polypropoxylated stearic acid, polypropoxylated erucic acid, polypropoxylated ricinoleic acid, polypropoxylated licanic acid, polypropoxylated elaeostearic acid, polypropoxylated arachidonic acid, polypropoxylated clupanodonic acid, and polypropoxylated brasidic acid.

(24) Cyclopentyl laurate, cyclopentyl myristate, cyclopentyl palmitate, cyclopentyl oleate, cyclopentyl elaidate, cyclopentyl linoleate, cyclopentyl linolenate, cyclopentyl stearate, cyclopentyl erucate, cyclopentyl ricinoleate, cyclopentyl licanate, cyclopentyl elaeostearate, cyclopentyl arachidonate, cyclopentyl clupanodonate, and cyclopentyl brasidate.

(25) Cyclohexyl laurate, cyclohexyl myristate, cyclohexyl palmitate, cyclohexyl oleate, cyclohexyl elaidate, cyclohexyl linoleate, cyclohexyl linolenate, cyclohexyl stearate, cyclohexyl erucate, cyclohexyl ricinoleate, cyclohexyl licanate, cyclohexyl elaeostearate, cyclohexyl arachidonate, cyclohexyl clupanodonate, and cyclohexyl brasidate.

(26) Methoxyethyl laurate, methoxyethyl myristate, methoxyethyl palmitate, methoxyethyl oleate, methoxyethyl elaidate, methoxyethyl linoleate, methoxyethyl linolenate, methoxyethyl stearate, methoxyethyl erucate, methoxyethyl ricinoleate, methoxyethyl licanate, methoxyethyl elaeostearate, methoxyethyl arachidonate, methoxyethyl clupanodonate, and methoxyethyl brasidate.

(27) Isopropoxyethyl laurate, isopropoxyethyl myristate, isopropoxyethyl palmitate, isopropoxyethyl oleate, isopropoxyethyl elaidate, isopropoxyethyl linoleate, isopropoxyethyl linolenate, isopropoxyethyl stearate, isopropoxyethyl ercuate, isopropoxyethyl ricinoleate, isopropoxyethyl licanate, isopropoxyethyl elaeostearate, isopropoxyethyl arachidonate, isopropoxyethyl clupanodonate, and isopropoxyethyl brasidate.

(28) Butoxyethyl laurate, butoxyethyl myristate, butoxyethyl palmitate, butoxyethyl oleate, butoxyethyl elaidate, butoxyethyl linoleate, butoxyethyl linolenate, butoxyethyl stearate, butoxyethyl erucate, butoxyethyl elaeostearate, butoxyethyl licanate, butoxyethyl ricinoleate, butoxyethyl arachidonate, butoxyethyl clupanodonate, and butoxyethyl brasidate.

(29) Methoxypropyl laurate, methoxypropyl myristate, methoxypropyl palmitate, methoxypropyl oleate, methoxypropyl elaidate, methoxypropyl linoleate, methoxypropyl linolenate, methoxypropyl stearate, methoxypropyl erucate, methoxypropyl ricinoleate, methoxypropyl licanate, methoxypropyl elaeostearate, methoxypropyl arachidonate, methoxypropyl clupanodonate, and methoxypropyl brasidate.

(30) Ethoxypropyl laurate, ethoxypropyl myristate, ethoxypropyl palmitate, ethoxypropyl oleate, ethoxypropyl elaidate, ethoxypropyl linoleate, ethoxypropyl linolenate, ethoxypropyl stearate, ethoxypropyl erucate, ethoxypropyl ricinoleate, ethoxypropyl licanate, ethoxypropyl elaeostearate, ethoxypropyl arachidonate, ethoxypropyl clupanodonate, and ethoxypropyl brasidate.

(31) Butoxypropyl laurate, butoxypropyl myristate, butoxypropyl palmitate, butoxypropyl oleate, butoxypropyl elaidate, butoxypropyl linoleate, butoxypropyl linolenate, butoxypropyl stearate, butoxypropyl erucate, butoxypropyl ricinoleate, butoxypropyl licanate, butoxypropyl elaeostearate, butoxypropyl arachidonate, butoxypropyl clupanodonate, and butoxypropyl brasidate.

(32) Isopropoxypropyl laurate, isopropoxypropyl myristate, isopropoxypropyl palmitate, isopropoxypropyl oleate, isopropoxypropyl elaidate, isopropoxypropyl linoleate, isopropoxypropyl linolenate, isopropoxypropyl stearate, isopropoxypropyl erucate, isopropoxypropyl ricinoleate, isopropoxypropyl licanate, isopropoxypropyl elaeostearate, isopropoxypropyl arachidonate, isopropoxypropyl clupanodonate, and isopropoxypropyl brasidate.

It is preferred that the $C_n$ of formula I have $n=11-18$ and $R=C_1-C_4$.

The esters which are preferably employed in the present invention are methyl oleate, methyl linoleate, methyl linolenate; ethyl oleate, ethyl linoleate, ethyl linolenate; isopropyl oleate isopropyl linolenate, isopropyl linoleate; n-butyl oleate, n-butyl linoleate, n-butyl linolenate; 2-ethylhexyl oleate, 2-ethylhexyl linoleate, 2-ethylhexyl linolenate, 2-ethylhexyl palmitate and 2-ethylhexyl stearate.

The esters of the present invention are commercially available or may be prepared by known methods such as transesterification of certain oils or esterification or epoxide addition of free fatty acids derived from such oils.

Esters are preferably prepared by a transesterification reaction using various oils such as soya oil, palm oil, safflower oil, peanut oil, corn oil, cottonseed oil, linseed oil, oiticica oil, tung oil, coconut oil, castor oil, perilla oil, rapeseed oil, sunflower oil, lard, tallow, fish oils, blubber, lipids from marine and land animals and lipids from vegetable sources. These oils are reacted with an appropriate alcohol in the presence of a transesterification catalyst such as a sodium alkoxide, sodium or potassium hydroxide, titanium tetraisopropoxide, etc. Desired temperatures and pressures may be employed depending upon the alcohol used in the reaction. The amount of catalyst is generally in the range of from about 0.1 to about 0.5% by weight based on the free fatty acid. The transesterification products are isolated by reduced pressure fractionation by distillation through a fractionation column. For example, an oil is mixed with 4–7 equivalents of methyl alcohol. A catalyst consisting of 0.1 to 1 part sodium methoxide or titanium tetraisopropoxide is added and the mixture refluxed 3–5 hours to transesterify (70°–71° C.). The product is stripped of excess methyl alcohol. Under reduced pressure, glycerine is distilled off followed by the methyl esters. A fractionating column is used to separate the individual methyl esters.

An esterification reaction may also be used to prepare the esters of formula (I). Free fatty acids derived from the above-described oils are reacted with the appropriate alcohols in the presence of esterification catalysts such as sulfuric acid, aryl sulfonic acids, alkyl sulfonic acids, etc. Desired temperatures and pressures can be selected depending upon the particular alcohol employed. For example, a fatty acid or mixture of fatty acids, obtained by splitting of glycerides or from tall oil, is mixed with 2–4 equivalents of alcohol. One to 4% of sulfuric acid is used as a catalyst. The water formed from esterification is distilled overhead azeotropically, and recovered alcohol returned to the reaction vessel. The esters are recovered by neutralizing the sulfuric acid, and fractionating under reduced pressure.

A third method for preparing the esters of the invention is the reaction between free fatty acids derived from the above-described oils and appropriate alkylene oxides. For example, a fatty acid or mixture of fatty acids is agitated at 105° to 120° C. in a pressure vessel and ethylene oxide or propylene oxide is introduced. About 0.1 to 0.4% potassium hydroxide is used as a catalyst. Epoxide addition is continued until the desired number of equivalents is absorbed. Excess epoxide is degased under reduced pressure. The product, hydroxyalkyl esters, are percolated hot over calcium silicate (Silene EF) to remove potassium hydroxide and yield a neutral product.

Although the esters of the present invention may be used alone as a fuel, they may also be used in combination with petroleum middle distillates to form a mixture therewith. The terms "petroleum middle distillates" or "middle distillates" as used herein include all middle distillates having a boiling point in the range of from about 140° C. to about 330° C. and being derived from sources such as crude oil, coal, oil shale and the like, which may be used in oil-burning devices, as opposed to gasoline engines which burn, by vaporizing in a carburetor, petroleum distillates having a lower boiling point than the middle distillates of the present invention.

Crude oil provides middle distillates by fractional distillation of the oil to produce, among others, products having a boiling point in the range of from about 140° C. to about 330° C. These middle distillate products contain various hydrocarbons such as paraffins, olefins, napthenes, aromatics and also minor amounts of cycloolefins, diolefins and multiunsaturated acyclic and cyclic compounds. Products obtained from coal hydrogenation would also provide suitable middle distillates as would the distillation products obtained from the retorting of oil shale.

Accordingly, the terms "petroleum middle distillates" or "middle distillates" as employed herein are intended to include those middle distillates which can be obtained from crude oil, coal hydrogenation and oil shale and the like. Of particular interest, as regards the present invention, are middle distillate products such as diesel oil, home heating oil and jet aircraft fuel. For example, diesel oil is becoming increasingly popular for use in trucks, automobiles, etc. However, due to anticipated long term shortages of raw materials such as crude oil, the supply is expected to decrease while the price will increase. Therefore, if these types of fuels can be mixed together with the esters of the present invention, the supply can be extended while obtaining more efficient use of the fuels. On the other hand, the esters can serve as a complete substitute for known middle distillate fuels and provide a new future source of energy.

Where the esters of the present invention are mixed together with middle distillates, such ester-middle distillate mixtures are in the ratio in the range of from about 1 to 99 to about 99 to 1 percent by weight based on the total weight of the mixture and preferably from about 10 to 75 to 90 to 25 percent by weight. It is also preferable that the middle distillates have a molecular weight of from about 140 to about 300.

It has also been found that, where the esters of the invention alone are employed as a fuel, such as in diesel automobiles, such fuel provides greater efficiency by obtaining more miles per gallon consumed.

Therefore, the esters of the invention not only provide a means for conserving diminishing supplies of middle distillates when mixed therewith, but also provide a substitute for such distillates and a new energy source.

TESTING PROCEDURE

Actual driving tests, using various types of fuels and fuel mixtures of the invention, were conducted using a 1979 Volkswagon diesel Rabbit automobile having a four-speed transmission (TEST CAR). The fuel gauge was calibrated to measure each gallon of fuel consumed. Except where indicated, tests were conducted on an open highway at a speed of about 55 miles per hour.

The following examples are illustrative of the invention and are not intended to limit the scope thereof.

EXAMPLE 1

Combustion tests were conducted to show that the esters of the present invention have similar combustion properties as middle distillates presently employed as fuels. The fuel representing the esters of the present invention was a mixture of esters containing by weight
46% methyl palmitate
33.6% methyl oleate
12.2% methyl stearate
8.1% methyl linoleate and will be referred to as composition A.

The middle distillate employed was commercially available #2 diesel fuel which is a standard fuel for diesel automobiles and trucks.

Two samples each (2.5 ml) of the diesel fuel and composition A were placed into a small container and ignited with an open flame. All samples ignited immediately upon exposure to the flame and the flash points were identical at room temperature. The combustion time for each sample is set forth in the Table I below.

TABLE I

|  | Sample No. | Combustion Time |
| --- | --- | --- |
| Composition A | 1 | 7 minutes 10 seconds |
| Composition A | 2 | 7 minutes 17 seconds |
| #2 Diesel | 1 | 6 minutes 13 seconds |

TABLE I-continued

|  | Sample No. | Combustion Time |
| --- | --- | --- |
| #2 Diesel | 2 | 6 minutes 21 seconds |

The diesel fuel burned forming dense black smoke, whereas composition A burned with a smoke-free flame.

In accordance with the above procedures, combustion tests were also conducted on mixtures containing various amounts of composition A mixed with diesel fuel. The results are shown in Table II below.

TABLE II

| % wt. Composition A in Mixture | Sample No. | Combustion Time |
| --- | --- | --- |
| 20.0 | 1 | 6 minutes 30 seconds |
| 20.0 | 2 | 6 minutes 27 seconds |
| 40.4 | 1 | 6 minutes 42 seconds |
| 40.4 | 2 | 6 minutes 39 seconds |
| 67.4 | 1 | 7 minutes 0 seconds |
| 67.4 | 2 | 6 minutes 55 seconds |

The above results show that the esters of the invention not only burn clearner than ordinary diesel fuel, but also burn longer and are more efficient as a fuel source.

EXAMPLE 2

(A) The TEST CAR was tested for ordinary mileage obtained using the #2 diesel fuel. Two gallons were consumed over 87.7 miles providing a mileage rating of 44 miles per gallon.

(B) A test was conducted using a mixture of composition A and #2 diesel fuel wherein the composition was present in the mixture in an amount of 20.0% by weight. Two gallons of this mixture was consumed over 118.7 miles providing a mileage rating of 62.3 miles per gallon.

EXAMPLE 3

A mixture of composition A and #2 diesel fuel was tested, wherein composition A was present in an amount of 40.4% by weight. Two gallons were consumed during driving over 117.4 miles providing a mileage rating of 61.6 miles per gallon.

EXAMPLE 4

A mixture of composition A and #2 diesel fuel was prepared, wherein composition A was present in an amount of 67.4% by weight. Two gallons were consumed while driving over 145.5 miles providing a mileage rating of 72.75 miles per gallon.

EXAMPLE 5

The TEST CAR was emptied of all fuel and one quart of composition A was added to the fuel tank. The engine was operated until the fuel was consumed. This procedure was repeated to completely flush the fuel system.

Three gallons of composition A were added to the fuel tank. One gallon was consumed on the open highway at 55 miles per hour over 75.7 miles providing a mileage rating of 75.7 miles per gallon.

The remaining fuel was consumed in city streets in normal heavy traffic until all the fuel was consumed. Total miles driven on the three gallons was 174 miles providing a combined city and highway mileage rating of 58 miles per gallon. This compares with the E.P.A.

estimate for similar driving on diesel fuel of 40 miles per gallon.

Accordingly these tests show that pure composition A provides about 25.7 more miles per gallon than ordinary diesel fuel based on E.P.A. estimates (50 miles per gallon) or about 51.4% more efficiency under highway conditions.

EXAMPLE 6

A mixture was prepared containing 8.33% by weight butyl oleate, 1.1% by weight hydroxyethyl stearate and the remainder #2 diesel fuel. One gallon of the mixture was consumed while driving 57.4 miles providing a mileage rating of 57.4 miles per gallon.

EXAMPLE 7

A mixture was prepared containing 10.2% by weight 2-ethylhexyl palmitate and the remainder #2 diesel fuel. One gallon was consumed while driving 56.4 miles providing a mileage rating of 56.4 miles per gallon.

EXAMPLE 8

A mixture was prepared containing 33% by weight methyl soyate (the methyl esters derived by transesterifying soya oil with methanol) and the remainder #2 diesel fuel. Two gallons were consumed while driving 116.2 miles providing a mileage rating of 58.1 miles per gallon.

EXAMPLE 9

A mixture was prepared containing 50% by weight of the $C_{18}$ methyl esters derived from methylation of rapeseed oil (approximately equal portions of methyl oleate, methyl linoleate, and methyl linolenate) and the remainder #2 diesel fuel. Three gallons were consumed while driving 194.1 miles providing a mileage rating of 64.7 miles per gallon.

In place of the various esters employed in the above examples, other esters of the invention as hereinbefore set forth may be substituted therefor to obtain substantially the same results.

What is claimed is:

1. A combustible energy-producing fuel mixture consisting essentially of
   (a) at least one fatty acid ester having the formula

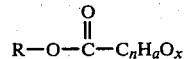

wherein R is alkyl having from 1 to 12 carbon atoms; alkoxyalkyl where the alkoxy portion has from 1-4 carbon atoms and the alkyl portion is ethyl or propyl; cyclopentyl or cyclohexyl, or hydroxy ethyl or hydroxy propyl; $n=11-22$; $a=2n+1$, $2n-1$, $2n-3$, $2n-5$ or $2n-7$ and x is 0 or 1, and
   (b) a middle distillate fuel, wherein the ester and middle distillates have a ratio in the range of from about 10 to 75 to about 90 to 25 percent by weight based on the total weight of the mixture.

2. The fuel mixture of claim 1 wherein the ester has a boiling point of from about 120° C. at 5 mm to about 340° C. at 1 mm.

3. The fuel mixture of claim 1 wherein the ester has a molecular weight in the range of from about 214 to about 489.

4. The fuel mixture of claim 1 wherein the ester is at least one member selected from the group consisting of methyl oleate, methyl linoleate, methyl linolenate; ethyl oleate, ethyl linoleate, ethyl linolenate; isopropyl oleate, isopropyl linoleate, isopropyl linolenate; n-butyl oleate, n-butyl linoleate, n-butyl linolenate; 2-ethylhexyl oleate, 2-ethylhexyl linoleate, 2-ethylhexyl linolenate, 2-ethylhexyl palmitate and 2-ethylhexyl stearate.

5. The fuel mixture of claim 1 wherein the middle distillates have a boiling point in the range of from about 140° C. to about 330° C.

6. The fuel mixture of claim 1 wherein the middle distillates have a molecular weight in the range of from about 140 to about 300.

* * * * *